United States Patent Office 2,712,978
Patented July 12, 1955

2,712,978

AMINO-ETHER GAS TREATING PROCESS

Clyde L. Blohm, Los Angeles, and Fred C. Riesenfeld, Hollywood, Calif., assignors to The Fluor Corporation, Ltd., Los Angeles, Calif., a corporation of California No Drawing. Application November 10, 1950, Serial No. 195,126

10 Claims. (Cl. 23—2)

This invention has to do with the treatment of gaseous mixtures for the removal of acidic constituents, and sometimes also moisture, and is directed particularly to the extraction of such acid gases as hydrogen sulfide and carbon dioxide from wet or dry hydrocarbon gases of which natural gas and refinery gases are typical.

A general practice has been to treat such gases with solutions of organic amines which are reactive with the acid gases and can be regenerated for reuse by heating to temperatures sufficient to drive off the absorbed acidic constituents. When it has been desired to dehydrate the gaseous mixture simultaneously with the acid gas removal, the prevalent practice has been to treat the gas with an amine solution containing also a polyhydric alcohol such as diethylene glycol. In the conventional plant cycle, the lean absorbent solution is passed downwardly through a contactor column in intimate mixture with the gas stream flowing upwardly therethrough, the rich absorbent is passed to a still wherein the solution is heated, frequently in the presence of stripping steam, to release the absorbed acidic gases and any moisture absorbed in the contactor, following which the resulting lean solution is cooled and returned to the contactor.

Various factors enter into the practical economics of the operation of this type of plant, among which are the required amino-to-gas ratio, or amine circulation rate, required for purification of the gas, amine losses from the contactor, the costs of stripping in the still, and corresponding factors applying to moisture absorptive absorbents where both moisture and acid gases are to be removed. The present invention has for its general object to improve the economic and efficiency aspects of the treating system with respect to those conditions mentioned, and specifically by providing for an important reduction of the required amine-to-gas ratio and amine circulation rate, reduction of costly amine losses from the contactor, reduced steam requirements in the still, and by the employment of a single compound or aqueous solution thereof, having the capacity for both acid gas absorption (with the attendant advantages mentioned) and moisture absorption with at least the same effectiveness as such non-acid gas absorbent dehydrating liquids as diethylene glycol.

The invention is predicated upon the use as an acid gas absorbent, and also as a moisture absorbent where the gas under treatment requires dehydration, of a suitable compound in the class of the hydroxy amino alkyl ethers having the general formula:

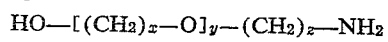

Wherein:
$x = 2$ to $3$
$y = 1$ to $4$
$z = 2$ to $3$

As illustrative of particular hydroxy amino ethers suitable for acid gas absorption, with or without dehydration, and having those advantages mentioned above, are $\beta,\beta'$-hydroxy amino ethyl ether

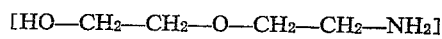

and $\beta$-hydroxy ($\beta'$-amino ethoxy) ethyl ether

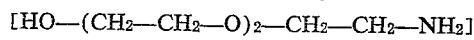

For purposes of description, we refer hereinafter to the use of $\beta,\beta'$ hydroxy amino ethyl ether as a typical and specific example of the hydroxy amino ethers contemplated.

As an illustration, treatment of a typical natural gas containing carbon dioxide and hydrogen sulfide with a 95% solution in water of $\beta,\beta'$-hydroxy amino ethyl ether (at 550 p. s. i. g. pressure in the contactor) will produce a treated gas containing less than 0.25 grain of hydrogen sulfide per 100 SCF and less than 0.1% carbon dioxide while absorbing 55 volumes of acid gas ($H_2S$ and $CO_2$) per volume of solution circulated; whereas a typical commercially used mixture of monoethanolamine, diethylene glycol, and water will produce a treated gas of comparable purity and degree of dehydration while absorbing up to only 32 volumes of acid gas per volume of solution circulated. Thus a treating plant using the hydroxy amino ether solution would require only about 60% of the liquid circulation of a comparable plant employing monoethanolamine as the acid gas absorbent and diethylene glycol as the moisture absorbent.

The following table shows comparative results in treating gaseous mixtures containing carbon dioxide and hydrogen sulfide, with $\beta,\beta'$-amino hydroxy ethyl ether and ordinary monothanolamine absorbents. Primarily the comparison is made to show the advantages with respect to the absorbent and absorbent acid gas volume ratio, and amine losses, resulting from the use of the amino ether:

| | | Operating Conditions | | | | | | Results | | | | |
|---|---|---|---|---|---|---|---|---|---|---|---|---|
| Run | Absorbent | Press., p. s. i. g. | Inlet Gas | | Nominal Solution Concentration | | | | Outlet Gas | | Acid Gas Absorbed by Soln. (Net), Vol./Vol. | Absorbent Lost as Vapor in Gas (80° F.), Lbs./MM s. c. f. | Water Content of Gas (80° F.), Lbs./MM s. c. f. |
| | | | $CO_2$, Percent | $H_2S$, Percent | Absorbent, Percent | Diethylene Glycol, Percent | Water, Percent | Amine Normality | $CO_2$, Percent | $H_2S$ Grain/ 100 s. c. f. | | | |
| 1 | HAEE | 550 | 5.2 | 0.44 | 95 | 0 | 5 | 9.5 | 0.0 | 0.19 | 55 | 0.06 | 10 |
| 2 | MEA | 550 | 3.9 | 0.68 | 25 | 70 | 5 | 4.4 | 0.0 | 0.17 | 32 | 0.50 | 10 |
| 3 | HAEE | 550 | 5.4 | 0.91 | 45 | 0 | 55 | 4.4 | 0.0 | 0.11 | 43 | 0.01 | |
| 4 | HAEE | 40 | 5.6 | 7.0 | 52 | 0 | 48 | 5.2 | 0.0 | 1.1 | 33 | 0.08 | |
| 5 | MEA | 40 | 3.6 | 6.9 | 33 | 0 | 67 | 5.3 | 0.0 | 1.0 | 35 | 3.2 | |

NOTE:
HAEE = $\beta,\beta'$-Hydroxy amino ethyl ether.
MEA = Monoethanolamine.

In run No. 1, the amino ether is compared with the use in run No. 2 of a typical monoethanolamine solution, in that both are dehydrating systems containing 5% water. It is noted that the amino ether solution absorbs 72% more acid gas per unit volume and loses only about one-eigth as much absorbent as the monoethanolamine solution, while giving comparable gas purity and dehydration. In run No. 3, an amino ether solution of the same amine normality as the monoethanolamine solution of run No. 2, produced comparable purification with a negligible absorbent loss, while absorbing 34% more acid gas per unit volume of solution. Runs 4 and 5 were conducted at low pressure with approximately equimolar aqueous solutions of the amino ether and monoethanolamine, in treating gas containing more hydrogen sulfide than carbon dioxide. Comparable treating efficiencies were obtained, while absorbent losses from the amino ether solution were only about one-fortieth of the monoethanolamine loss.

Speaking generally of the contemplated amino ethers in the general class hereinbefore defined, it is preferred to use those amino ethers having a viscosity of less than 100 centipoises at 25° C., a vapor pressure not exceeding 0.1 mm. of mercury at 25° C., and a boiling point in the range of 175 to 300° C. at 760 mm. of mercury pressure.

As previously indicated, substantial operating expense may be occasioned by the losses of amine from the contactor in the treated gas stream. By reason of its low vapor pressure as compared with the vapor pressure of the more volatile amines customarily employed and having comparable absorption efficiencies, the amino ether remains in the system with comparatively low losses from the contactor.

Obviously the possibility of using a single compound for both acid gas and moisture absorption in a single treating step or stage, presents important advantages in that no requirements for maintaining proper proportions of separate acid gas and moisture absorbents are involved, and as previously explained, a lesser quantity or circulation rate of the single amino ether absorbent, will serve all the purposes of a combination absorbent such as monoethanolamine and glycol circulated at a higher rate.

Greater economies in the still operation are possible by reason of the higher acid gas and moisture concentration in the rich solution, all of which tend to decrease the heat requirements, or the amounts of steam customarily employed, to aid stripping in the still.

As to operating conditions, the concentration of the amino ether in the absorbent solution may vary dependent upon such considerations as whether the gas being treated requires dehydration. For purposes of acid gas removal, the amino ether (and again typically $\beta,\beta'$-hydroxy amino ethyl ether) may be used in aqueous solutions in concentrations ranging between about 20% to 95% by volume of the solution. For purposes of dehydration the amino ether concentration may be kept in excess of 90%, and typically in the neighborhood of 95%. The contactor temperatures and pressures may be of the order customarily employed in amine treating plants, typically solution inlet temperatures between 70° F. to 130° F. with pressures ranging from slightly above atmospheric pressure to within the 600 to 800 pound range. The still temperature may be governed simply by the heating of the rich solution required to drive off the absorbed acid gases, leaving in the stripped solution the water content desired for its use as a lean absorbent.

We claim:
1. The process of treating a gaseous mixture stream for the removal therefrom of an acidic gas of the group consisting of hydrogen sulfide and carbon dioxide, that includes contacting said mixture with an absorbent containing an amino ether having the general formula

$$HO-[(CH_2)_x-O]_y-(CH_2)_z-NH_2$$

wherein "$x$"=2 to 3, "$y$"=1 to 4, and "$z$"=2 to 3, and absorbing the acid gas in the amino ether, separately heating and regenerating the amino ether by liberation of the absorbed acid gas, and again contacting said gaseous stream with the regenerated amino ether.

2. The process as defined by claim 1, in which said absorbent consists of an aqueous solution of the hydroxy amino ether.

3. The process as defined by claim 1, in which said gaseous mixture contains moisture, said moisture is absorbed by the amino ether, and the absorbed moisture is liberated by said heating of the hydroxy amino ether.

4. The process so defined by claim 3, in which said absorbent consists of a solution containing water and in excess of 90% of the hydroxy amino ether.

5. The process as defined by claim 1, in which said gaseous mixture contains moisture, and said absorbent contains water and a polyhydric alcohol in addition to the hydroxy amino ether.

6. The process of treating a gaseous mixture stream for the removal therefrom of an acidic gas of the group consisting of hydrogen sulfide and carbon dioxide, that includes contacting said mixture with an absorbent containing $\beta,\beta'$-hydroxy amino ethyl ether and absorbing the acid gas in the amino ether, separately heating and regenerating the absorbent, and again contacting said gaseous stream with the regenerated absorbent.

7. The process of treating a gaseous mixture stream for the removal therefrom of an acidic gas of the group consisting of hydrogen sulfide and carbon dioxide, that includes contacting said mixture with an absorbent containing water and between about 20 to 95% of $\beta,\beta'$ hydroxy amino ethyl ether and absorbing the acid gas in the amino ether, separately heating and regenerating the absorbent, and again contacting said gaseous stream with the regenerated absorbent.

8. The process of treating a gaseous mixture stream for the removal therefrom of moisture and an acid gas of the group consisting of hydrogen sulfide and carbon dioxide, that includes contacting said mixture with an absorbent containing water and in excess of 90% $\beta,\beta'$ hydroxy amino alkyl ether and absorbing moisture and the acid gas in the absorbent, separately heating and regenerating the absorbent, and again contacting said gaseous stream with the regenerated absorbent.

9. The process of treating a gaseous mixture stream for the removal therefrom of an acidic gas of the group consisting of hydrogen sulfide and carbon dioxide, that includes contacting said mixture with an absorbent containing $\beta'$-hydroxy ($\beta$-amino ethoxy) ethyl ether and absorbing the acid gas in the amino ether, separately heating and regenerating the absorbent, and again contacting said gaseous stream with the regenerated absorbent.

10. The process of treating a gaseous mixture stream for the removal therefrom of an acidic gas of the group consisting of hydrogen sulfide and carbon dioxide, that includes contacting said mixture with an absorbent containing water and between about 20 to 95% of $\beta$-hydroxy ($\beta$-amino ethoxy) ethyl ether and absorbing the acid gas in the hydroxy amino ether, separately heating and regenerating the absorbent, and again contacting said gaseous stream with the regenerated absorbent.

References Cited in the file of this patent

UNITED STATES PATENTS

| | | |
|---|---|---|
| 2,065,112 | Bottoms | Dec. 22, 1936 |
| 2,139,122 | Hass | Dec. 6, 1938 |
| 2,139,375 | Millar | Dec. 6, 1938 |
| 2,177,068 | Hutchinson | Oct. 24, 1939 |

FOREIGN PATENTS

| | | |
|---|---|---|
| 344,786 | Great Britain | Mar. 4, 1931 |
| 410,848 | Great Britain | May 23, 1934 |